US 6,597,388 B2

(12) United States Patent
Pierson

(10) Patent No.: US 6,597,388 B2
(45) Date of Patent: Jul. 22, 2003

(54) LASER-INDUCED THERMAL IMAGING WITH MASKING

(75) Inventor: Dallas K. Pierson, Oakdale, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 35 days.

(21) Appl. No.: 09/886,446

(22) Filed: Jun. 21, 2001

(65) Prior Publication Data

US 2002/0196325 A1 Dec. 26, 2002

(51) Int. Cl.[7] .................................................. B41J 2/47
(52) U.S. Cl. ........................................ 347/240; 347/251
(58) Field of Search ................................ 347/233, 234, 347/237, 240, 248, 251, 132, 145, 107

(56) References Cited

U.S. PATENT DOCUMENTS

| 4,900,130 A | 2/1990 | Haas ........................... 359/198 |
| 5,164,742 A | 11/1992 | Baek et al. ................... 347/234 |
| 5,183,798 A | 2/1993 | Sarraf et al. ................. 503/227 |
| 5,329,297 A | 7/1994 | Sanger et al. ................ 347/237 |
| 5,555,006 A | 9/1996 | Cleveland et al. ............. 347/41 |
| 5,602,572 A | 2/1997 | Rylander ..................... 358/309 |
| 5,724,086 A | 3/1998 | Mackin et al. ............... 347/237 |
| 5,808,655 A | 9/1998 | Haas et al. .................. 347/234 |
| 5,818,498 A | 10/1998 | Richardson et al. ........ 347/237 |
| 5,935,758 A | 8/1999 | Patel et al. .................. 430/200 |
| 5,992,962 A | 11/1999 | Yen et al. ....................... 347/9 |
| 6,001,530 A | 12/1999 | Kidnie et al. ................ 430/201 |
| 6,052,140 A * | 4/2000 | Yoshida ....................... 347/234 |
| 6,067,405 A | 5/2000 | Serra ............................. 358/1.8 |
| 6,109,454 A | 8/2000 | Stangebye-Hansen ........ 211/40 |
| 6,171,766 B1 | 1/2001 | Patel et al. .................. 430/339 |
| 6,179,407 B1 | 1/2001 | Bockman ..................... 347/40 |

OTHER PUBLICATIONS

"High Power Multi-Channel Writing Heads," IS & T's 47th Annual Conference/ICPS 1994, Creo Products, Inc., Dan Gelbart, pp. 608–611.

* cited by examiner

Primary Examiner—Hai Pham
(74) Attorney, Agent, or Firm—Shumaker & Sieffert, PA

(57) ABSTRACT

The invention is directed to compensating for imaging aberrations that result from repeated passes by an imaging laser array. The techniques described herein reduce the undesirable aberrations. In general, the techniques provide for printing a first line of image data and a set of contiguous lines as a function of the image data and a first mask. On a subsequent pass, these lines are overlapped. The line that overlaps the first line prints the image data again, but masked. The lines that overlap the contiguous lines print the image data normally.

30 Claims, 7 Drawing Sheets

FIG. 6

LASER-INDUCED THERMAL IMAGING WITH MASKING

TECHNICAL FIELD

The invention relates to imaging, and more particularly to laser-induced thermal imaging.

BACKGROUND

An image may be encoded into image data, which may be transmitted, stored, processed, or otherwise manipulated electronically. The image may be decoded and converted to hard copy by sending the image data to a printer. Laser thermal printers, with their high resolution capability, provide a popular mode for producing hard copy images from digital image data.

Laser thermal printers may be used with a variety of imaging media or "receptors," including many kinds of film and paper. In a typical laser imager, a receptor is placed very close to a color-coated substrate or "donor" sheet, and a plurality of laser beams are directed at the donor. Each laser may emit an infrared beam, and the colored coating, which may contain a colorant and/or an infrared-sensitive dye, heats when exposed to a beam of sufficient power. The resulting thermal energy induced by the lasers triggers the imaging process, causing colorant to transfer from the donor to the receptor.

The lasers are typically arranged in a linear array, with each laser in the array individually modulated by image data. The array may include any number of lasers, although an array of sixteen lasers is typical. Semiconductor or "diode" lasers are commonly used in an array for reasons of cost, convenience and reliability. The lasers may, for example, emit infrared beams with wavelengths of approximately 830 nm. The width of the array, which is a function of the spacing of the lasers, is usually adjustable.

The image data that modulate the lasers represent the shape, size, color and density of the image. Image data are routinely stored electronically, and are provided to the array in the form of a plurality of signals, typically one signal for each laser. Although the lasers in the array strike only a small portion of the donor and receptor at any one time, the array can print large regions by scanning across the donor and receptor. As the array scans the donor and receptor, each laser in the array emits a beam in response to an image signal. In most cases, the laser array may make several successive parallel or helical passes to generate the complete image. Each pass of the array prints a strip or "swath" on the receptor. To avoid the appearance of white lines in the receptor, i.e., unprinted spaces between swaths, successive swaths may abut or overlap preceding swaths.

When a beam sufficiently heats the donor, a spot of colorant is transferred from the donor to the receptor. By modulating the duration for which a laser beam strikes an area on the donor, modulating a laser's intensity and/or modulating the size of the beam, spots of colorant of different sizes may be formed, and thereby colors may appear darker or fainter in color. Often a region of the receptor is intended to receive no colorant from the donor, and when scanning that region, a laser emits a beam at a power level below that needed to transfer colorant.

The receptor may be scanned multiple times using donors of different colorants, creating a multicolor image by the superposition of multiple monochromatic images. By repeating scans with donors coated with cyan, yellow, magenta and black, for example, a multicolor image may be formed on the receptor. For high fidelity printing systems, additional colors such as green and orange may be provided.

SUMMARY

The invention is directed to compensating for imaging aberrations, sometimes referred to as "artifacts," that result from repeated passes by an imaging laser array. The invention is particularly useful in a thermal imaging system that makes use of a laser array. Ideally, an observer ought to be able to look at a printed image and see no indications that the image had been formed by repeated passes of a laser array. In some cases, however, unintended patterns, such as groups of lines or streaks, appear in the printed image. Such artifacts may be evident in halftone printing, when printing a single color and when overprinting multiple colors.

At least two factors contribute to these artifacts. One factor is the formation of "swath lines," which may manifest at an edge of a laser swath in the form of heavier colorant depositions. Swath lines may result from the deposition of excess colorant along an edge of the swath, causing a heavier line of colorant than intended and causing the swath to have a non-uniform distribution. Swath lines may also result from a deficit of colorant. The end lasers in the array, i.e., the outermost lasers in the array, have one neighbor laser instead of two neighbor lasers. As a result, the lines on the edge of the scan may receive less thermal energy, causing less transfer of colorant.

Ruling and screen angle can also contribute to the artifacts. In halftone printing, printed images are formed from halftone dots, with the halftone dots varying in size according to the lightness or darkness of the image. The halftone dots are printed by the lasers, but the halftone dots are generally much bigger than the laser beams. Each laser prints in units of "pixels," and usually a matrix of several pixels is required to make up a single halftone dot. Consequently, it may take several lasers in the array to print a single halftone dot. Halftone dots are printed at a defined ruling, i.e., a number of halftone dots per unit of length, and at a defined screen angle, i.e., an angle at which the rows of halftone dots are oriented.

In standard four-color printing, each color is printed using approximately the same ruling, but each color is "screened" at a different angle to prevent halftone dots of different colors from printing one on top of the other and obscuring each other. Screening colors at different angles also avoids generation of an objectionable moiré pattern between the color layers.

When the spatial frequency of the swath lines and the spatial frequency of the halftone dots are close to one another but not equal, a moiré pattern may form. In other words, two small superimposed patterns of similar spatial frequency may combine visually to form a larger and more prominent moiré pattern. The moiré pattern usually resembles spurious light and/or dark bands in the image, and is generally considered to be an undesirable aberration of the image. The phenomenon may also be described as "beating," because it results from superposition of patterns close to each other in spatial frequency. In a multicolor image, a plurality of screen angles come into play, and beating may occur in one or more colors, resulting in superimposed moiré patterns.

Stochastic printing is an alternative to halftone printing, in which color density is related to the spatial density of pixels printed by lasers. Moiré patterns tend not to form with stochastic printing because stochastic printing does not employ rulings and screen angles. In stochastic printing, however, swath lines may generate undesirable banding artifacts.

To reduce the artifacts described above, techniques may be employed to break up and/or reduce the swath lines, thereby reducing banding. In general, the techniques provide for overlapping swaths and providing masking for one or both passes that print the overlapped region. The masks superficially resemble randomized patterns of logical values, but for best performance, the masks are not fully randomized.

Masking, while reducing some banding artifacts, may introduce new banding artifacts. In particular, each laser in the array, when printing, derives some benefit from the heat generated by its neighbor lasers. An end laser, which has only a single adjacent neighbor laser, derives less thermal benefit than other lasers and consequently may print lower density pixels. As a result, the line width of an end laser may be narrower than the line width of other lasers, which can lead to banding. Another potential source of banding is too much transfer of colorant caused by overlapping swaths. The banding artifacts are especially evident along the edges of the swath.

The invention presents techniques for enhancing the masking to reduce or eliminate the new banding artifacts. The techniques generally provide for a special masking of one or more selected lines on the first swath, and for masked printing on the second swath.

In one embodiment, the invention presents a method for printing with a laser imaging system having a plurality of lasers. The method comprises printing a first line on a thermally sensitive medium with a laser modulated as a function of a set of data, and thereafter printing a second line on the thermally sensitive medium with a laser modulated as a function of the set of data and a mask. The second line overlaps the first line.

Because the image data are printed in the first line, printing the second line does not fill in any missing pixels, but merely over-prints some of the previously printed pixels. The second line, therefore, does not add much to the printed image. Because the second line was printed in a masked form overlapping the first line, the narrowness of the second line is not noticeable and the risk of transfer of too much colorant is reduced. This technique provides a thermal benefit to lasers neighboring the laser that prints the second line.

In another embodiment, the invention presents a method, which comprises printing a first line on a thermally sensitive medium with a first laser modulated as a function of a first set of data and printing a first set of contiguous lines on a thermally sensitive medium with a first set of lasers modulated as a function of a second set of data and a first mask. The method also comprises printing a second line on the medium overlapping the first line with a second laser modulated as a function of the first set of data and a second mask, and printing a second set of contiguous lines on the medium overlapping the first set of lines with a second set of lasers modulated as a function of the second set of data. In this embodiment, some or all lines of the image data may be printed twice.

In a further embodiment, the invention presents a system, which includes a thermally sensitive color donor including colorant, a receptor positioned to receive colorant from the donor, a controller and a set of lasers. Each of the lasers emits a beam directed at the donor. The controller controls a first laser as a function of image data and a first mask, the controller controls a first subset of lasers as a function of the image data, and the controller controls a second subset of lasers as a function of the image data and a second mask.

The details of one or more embodiments of the present invention are set forth in the accompanying drawings and the description below. Other features, objects, and advantages of the present invention will be apparent from the description and drawings, and from the claims.

DESCRIPTION OF THE DRAWINGS

FIG. 6 depicts an exemplary mask in accordance with an embodiment of the invention.

DETAILED DESCRIPTION

Figure 1:
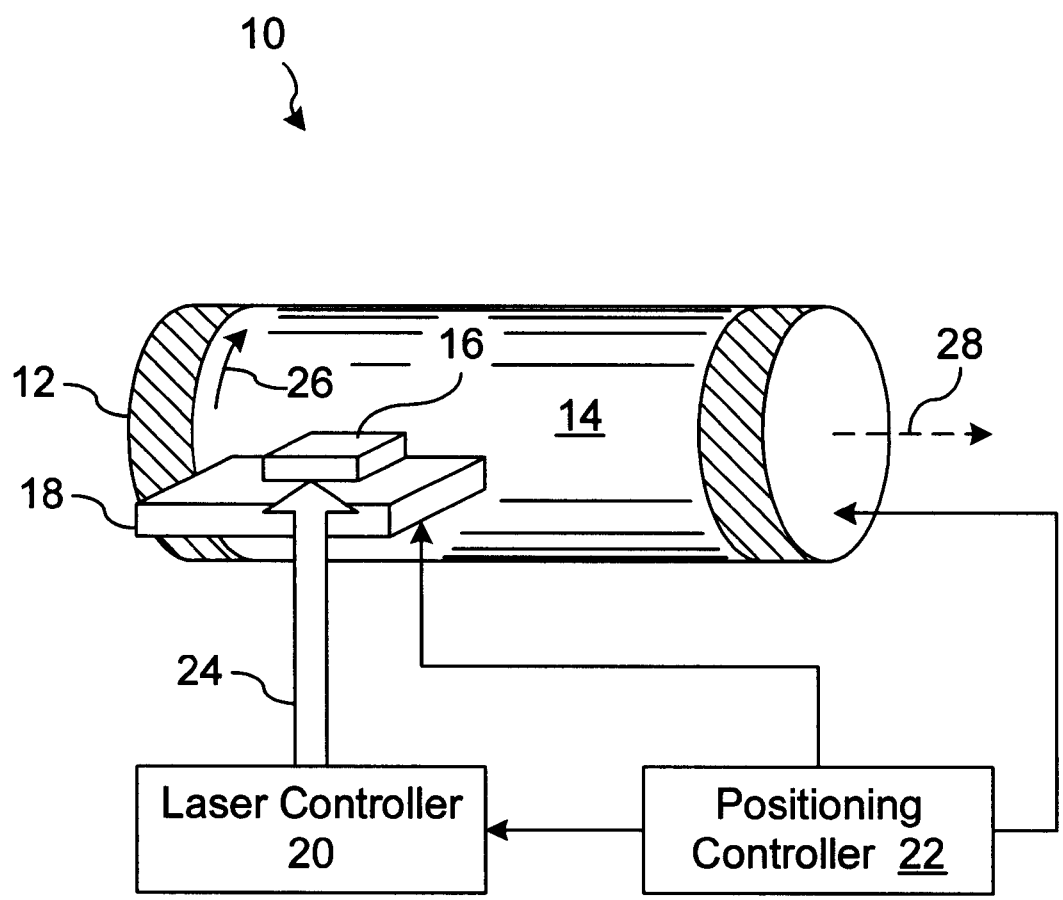
FIG. 1 is a diagram of a laser imaging system.

FIG. 1 shows a typical laser thermal imaging system 10. Mounted to rotating drum 12 is a receptor (not shown in FIG. 1), such as film or paper. Donor 14 is mounted on the drum over the receptor. As drum 12 rotates under the control of positioning controller 22, donor 14 and the receptor rotate together. The direction of rotation 26 of drum 12 is called the "fast scan direction."

Writing head 16, which includes an array of lasers, is coupled to optical head platform 18, which positions writing head 16 with respect to drum 12. Optical head platform 18 can move laterally with respect to drum 12. The direction in which optical head platform 18 can move is the same direction 28 as the axis of rotation of drum 12, and is called the "slow scan direction." Writing head 16 may print parallel swaths in fast scan direction 26 or slow scan direction 28, but usually writing head 16 prints swaths helically by printing in fast scan direction 26 and slow scan direction 28 simultaneously.

Positioning controller 22 regulates the rotational speed of drum 12 and the position of optical head platform 18. By rotating drum 12 and/or moving optical head platform 18, positioning controller 22 can bring one or more lasers to bear upon substantially any point on the surface of donor 14.

Lasers in writing head 16 are under the control of laser controller 20, and are modulated by image data 24 supplied by laser controller 20. Positioning controller 22 typically sends a timing signal to laser controller 20 so that the correct image data will be supplied to the lasers when the laser array is in the correct position relative to donor 14. Laser controller 20 may be, for example, a computer such as a personal computer, a microcomputer or an embedded processor or microcontroller.

Figure 2:
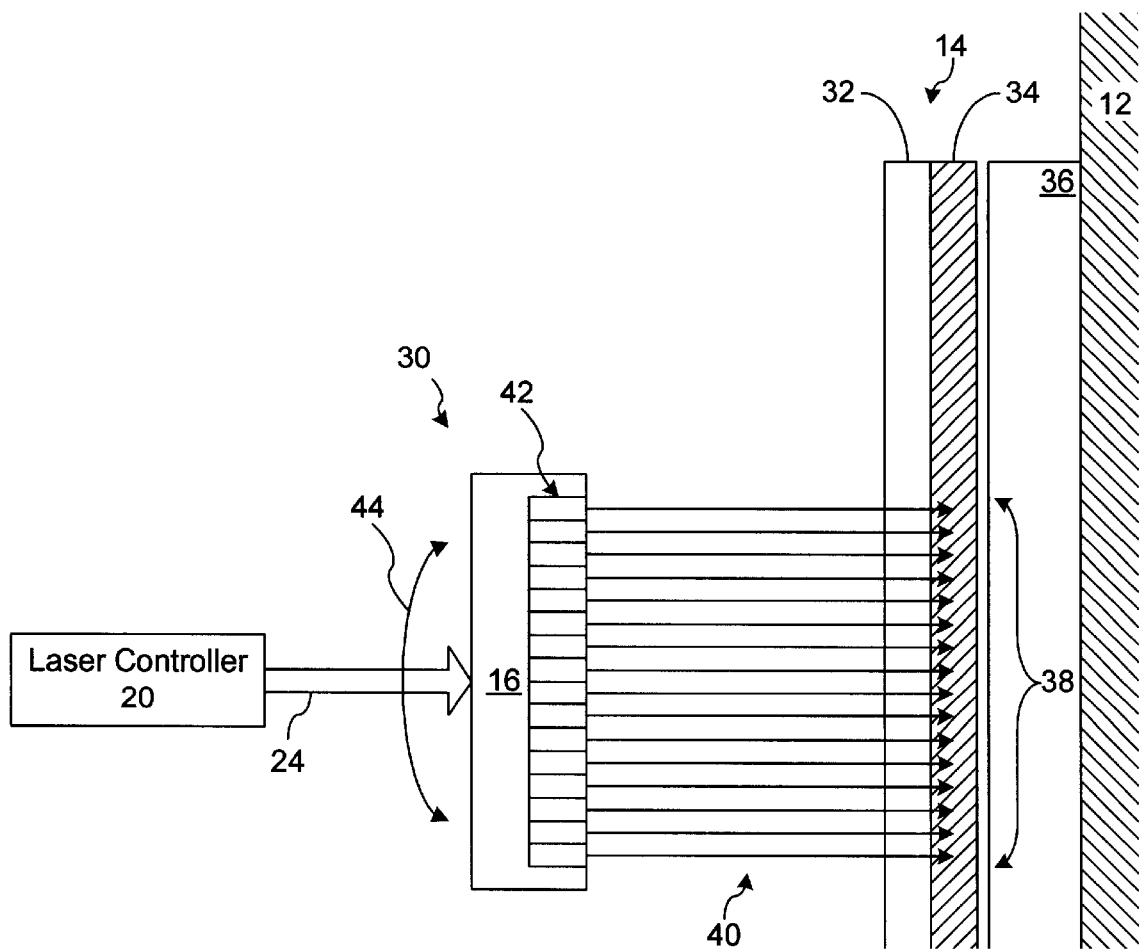
FIG. 2 is a diagram of an array of lasers with a donor and receptor.

FIG. 2 depicts a laser thermal imaging process. Writing head 16 comprises an array 42 of sixteen lasers. Each laser in array 42 is separately controlled by laser controller 20. Although sixteen individual laser beams 40 may be emitted from array 42 as shown in FIG. 2, the invention may be used with thermal imaging arrays having more or fewer individual lasers. Beams 40 strike substrate 32 of donor 14, heating colored coating 34. Substrate 32 and/or colored coating 34 may be selected to absorb the wavelength of radiation emitted by the lasers. Heating causes colorant to transfer from donor 14 onto receptor 36.

The surface of receptor 36 may be, in effect, divided into small picture elements or pixels. A single laser can generate a spot of colorant, sometimes called a "laser dot," at one pixel on receptor 36. The path taken by a laser beam as it scans across donor 14 is called a "line," each line including one or more pixels. Each laser may or may not print one or more laser dots along the line that it scans, depending upon the modulating signal received from laser controller 20.

The total of the lines printed by laser beams 40 make up swath 38. The width of swath 38 may be varied by rotating array 42 about an axis perpendicular to the surface of drum 12, as indicated by reference numeral 44, allowing printing at different resolutions. As described above, a typical halftone dot is larger than a pixel or a line, so it takes several lasers to print a single halftone dot. Also as described above, swath lines tend to form along an edge of swath 38. The spatial frequency of the swath lines, in conjunction with the spatial frequency of colored regions due to ruling and screen angle, may generate an undesirable moiré pattern.

Figure 3:
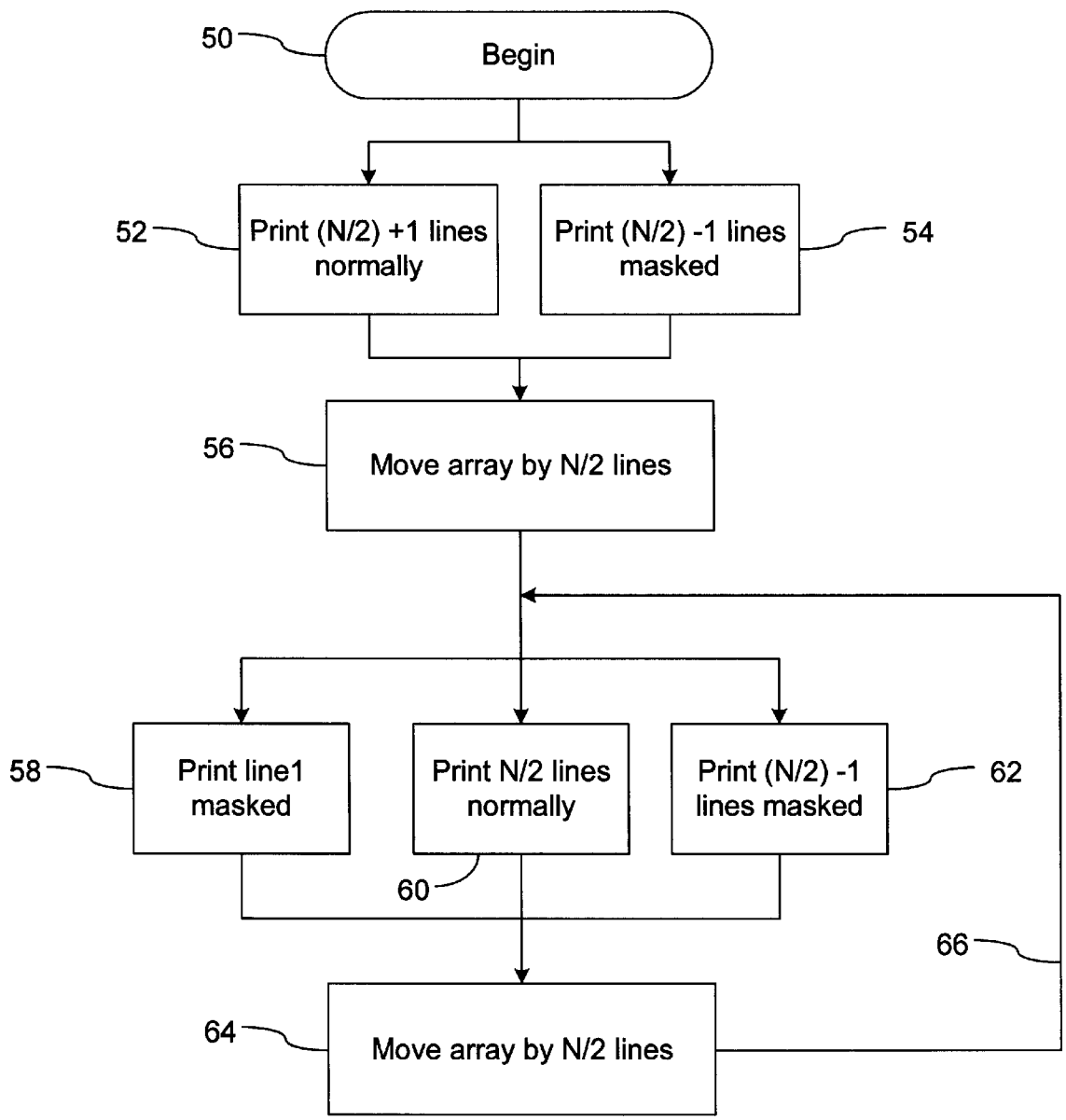
FIG. 3 is a flowchart illustrating an embodiment of the invention.

FIG. 3 is a flowchart showing a technique by which banding may be substantially reduced. The technique assumes that there are N lasers in the array, and that N is an even number, such as sixteen. This assumption is for purposes of illustration, and the invention is not limited to arrays having an even number of lasers. The lasers in the array may be identified by number, from 1 to N.

The technique provides for printing each line twice, using two passes per line. In one of the passes, the line is printed normally, according to the image data delivered to laser controller 20 for modulation of the laser that prints the line. In the other pass, the line is printed using, in addition to the modulating image data, a logical mask, which will be described in more detail below. The later pass overlaps the earlier pass.

In some kinds of laser thermal imaging, printing part of an image twice generally does not result in an excess of colorant or other noticeable aberration of the image, as long as the thermal energy received by the donor is not too high. If the thermal energy is too high, then excess colorant may transfer to the receptor, resulting in banding. Printing part of each swath with a mask can help keep thermal energy within reasonable bounds. Printing part of each swath with a mask can also significantly reduce the appearance of swath lines, reduce banding, disrupt the moiré pattern and improve the visual appearance of the resulting image.

When printing a typical swath, the first line is printed in a masked form (58), i.e., the first laser in the array prints the first line modulated as a function of the image data for that line and a first mask. The adjacent N/2 lines are printed normally (60), i.e., the adjacent N/2 lines are printed as a function of the image data without a mask. The remaining (N/2)−1 lines are printed masked (62), i.e., the lasers printing the remaining lines are modulated as a function of the image data and a second mask. Optical head platform 18 moves the laser array by N/2 lines (64) and the printing process may be repeated (66).

When printing first commences (50), the laser array may print (N/2)+1 lines normally (52) and (N/2)−1 lines masked (54). Optical head platform 18 moves the laser array by N/2 lines (56). In other words, the technique on the very first pass is the same as described above, except that the first line is printed normally and is not printed masked.

When the printing is completed, the full image has been printed. Every line has been fully printed and no image data have been discarded. Some image data, however, have been printed twice.

Figure 4:
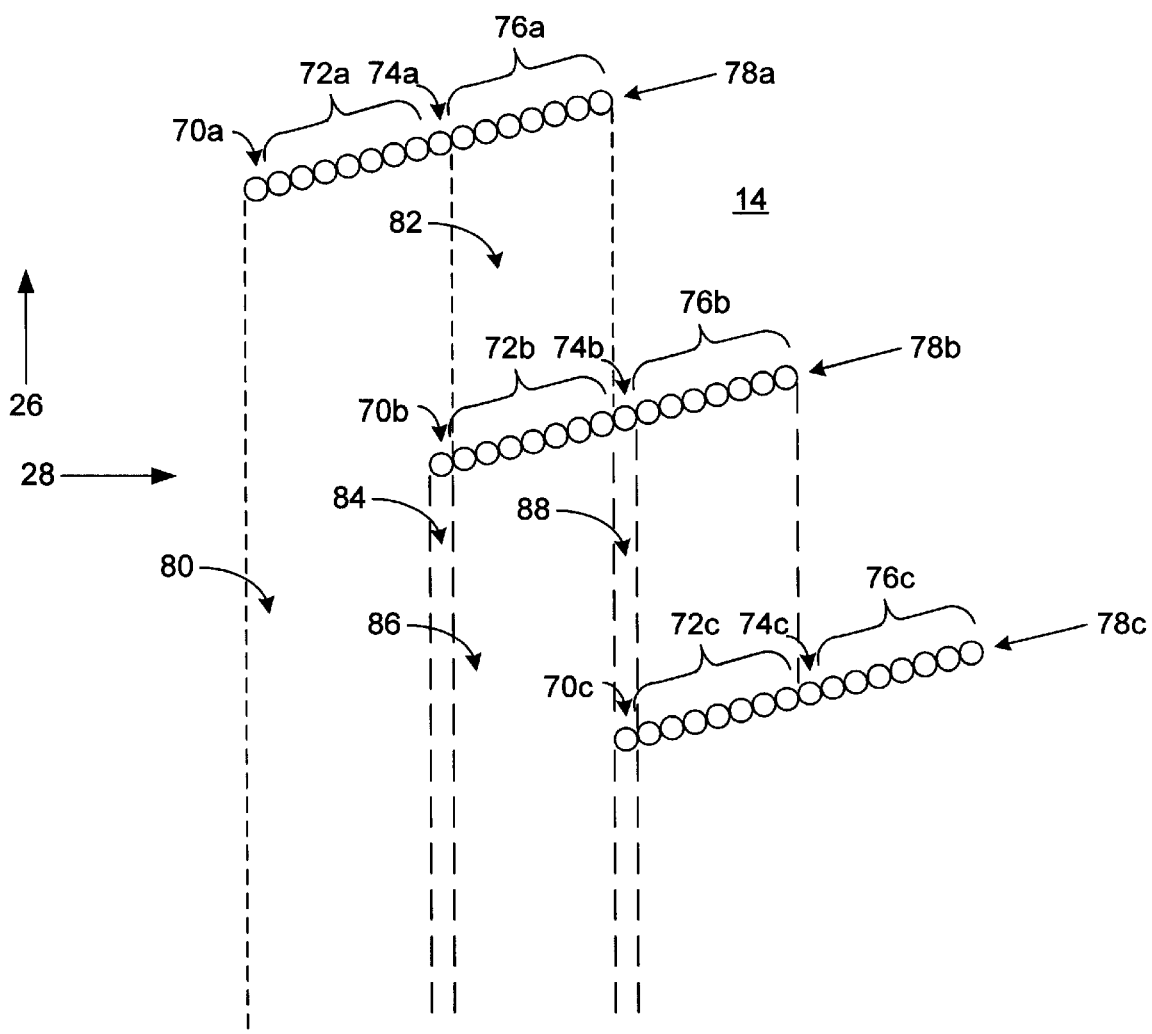
FIG. 4 is a diagram illustrating masking and overlapping.

FIG. 4 illustrates the techniques shown in FIG. 3. Donor 14 is scanned in fast scan direction 26. The energy from a laser array on the first pass is represented as a set of sixteen contiguous spots 78a, with each spot representing a laser in the array. Each spot scans a line. For convenience, the spots and the lines printed by the spots may be identified by the number system described above, e.g., the line associated with the first spot 70a will therefore be called line one, the line associated with the ninth spot 74a will therefore be called line nine, and so on.

On the very first pass, line one 70a through line nine 74a print the image data normally (52 in FIG. 3), resulting in lines of fully-printed image data 80. Lines ten through sixteen 76a print masked data (54).

For a second pass, the array is moved eight lines in slow scan direction 28 (56) causing spots 78b to shift by eight lines in slow scan direction 28. Line one 70b overlaps a line previously printed by line nine 74a. Line one 70b prints the same image data as line nine 74a from the previous pass, except line one 70b prints the image data masked (58). As a result, a line of image data printed normally is overlapped by a line of same image data printed masked 84.

When line one 70b overlaps line nine 74a, little is added to the printed image. Line one may be narrower than other lines because line one 70b is printed by an end laser, but the narrowness is inconspicuous because line one 70b overlaps line nine 74a. Because line one prints masked, the risk of transfer of too much colorant is reduced. In addition, the laser printing line one provides a thermal benefit to its neighbor laser, which is printing line two. If the laser printing line one were to be totally deactivated, then the neighbor laser would not receive a thermal benefit, and the quality of printing by the neighbor laser could suffer as a result. The thermal benefit of adjacent lasers will be described in more detail below.

On the second pass, lines two through eight 72b print normally (60), overlapping masked image data 82 printed by lines ten through sixteen 76a on the previous pass. As a result, seven lines of masked image data are overlapped by seven lines of normally printed image data 86.

Line nine 74b is also printed normally on the second pass (60). Notably, line nine 74b does not overlap any previously printed image data. As a result, a single line of fully printed image data 88 is printed on the second pass which does not overlap any previously printed image data. Image data 88 printed by line nine 74b will be overlapped on the third pass, however, when line one 70c overlaps image data printed by line nine 74b. Lines ten through sixteen 76b print image data masked, which are overlapped by lines two through eight 72c on the third pass.

Figure 5:
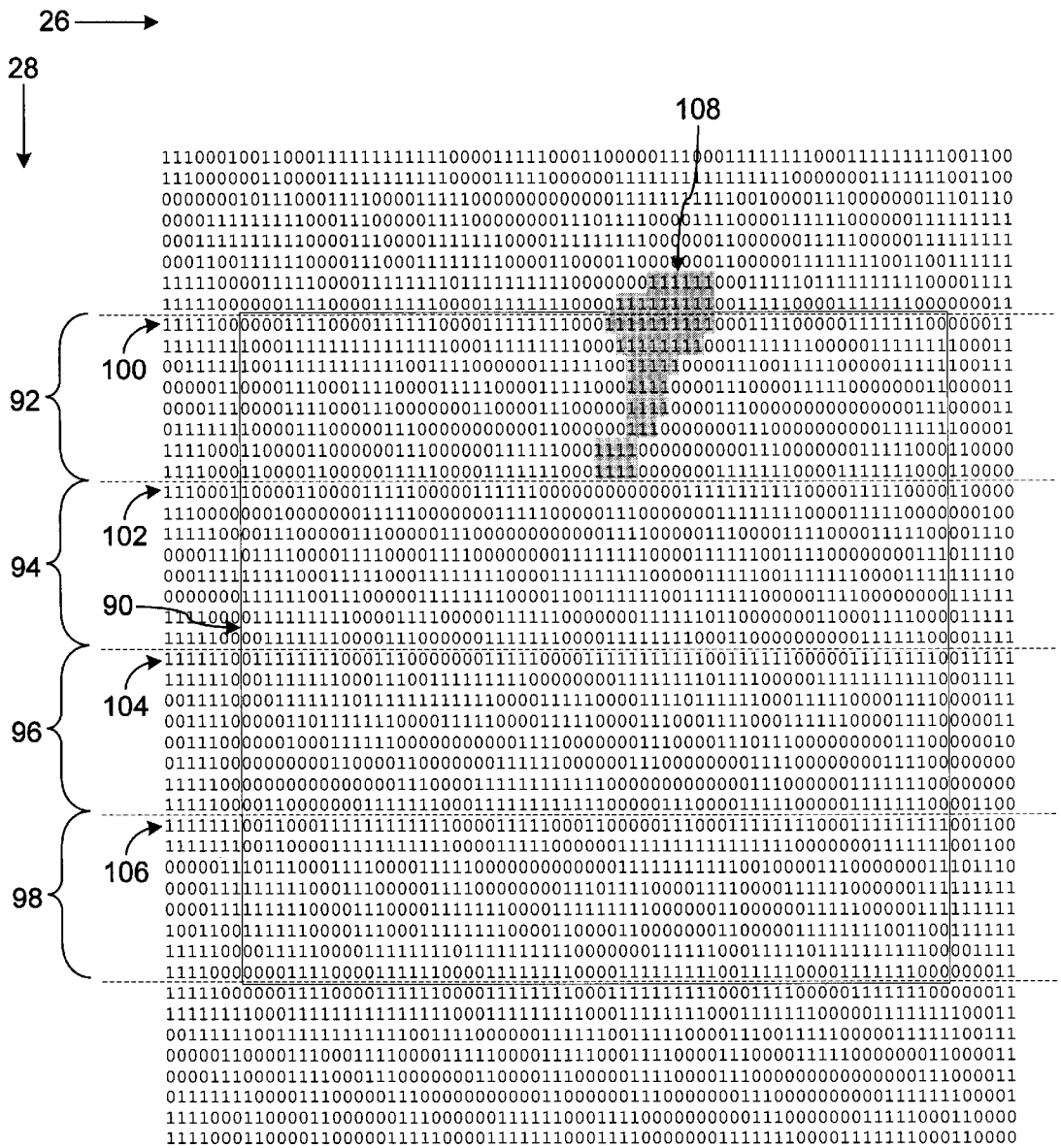
FIG. 5 depicts an exemplary mask in accordance with an embodiment of the invention.

An exemplary mask 90 is shown in FIG. 5. Mask 90 is a set of logical values in the form of a 64-by-32 matrix of logical '0' values and logical '1' values. Each logical value corresponds spatially to a pixel on the receptor. Arrow 26 identifies the fast scan direction and arrow 28 identifies the slow scan direction. Mask 90 may be stored in the memory of laser controller 20 or anywhere in the data handling path.

When a laser prints masked data, the laser's image data for a pixel is combined by a logical AND operation with the mask logical value corresponding to the pixel. When the value in the mask corresponding to a pixel is a logical '1,' the laser is enabled and the pixel is printed normally. When the value in the mask corresponding to a pixel is a logical '0,' the laser is disabled and the pixel is not printed.

Although a 64-by-32 area of pixels is fairly small, mask 90 can be replicated by tiling in fast scan direction 26 and slow scan direction 28, and can thereby be expanded to cover a printing surface of arbitrary size. Mask 90 is shown in FIG. 5 surrounded by logical values that are replications of mask 90.

A single mask may support several swaths. When printing sixteen-line swaths with eight lines of overlap, for example, mask 90 may be divided into four subset masks 92, 94, 96 and 98. In a first swath, image data may be masked by mask subset 92, in a second swath, image data may be masked by mask subset 94, and so on. By tiling mask 90 in slow scan direction 28, subset mask 92 may be used after subset mask 98. Using a variety of subset masks breaks up swath lines more effectively than simply using a single smaller mask over and over.

In mask 90, approximately half of the mask values are logical '1' values and approximately half of the mask values are logical '0' values in both fast scan direction 26 and slow scan direction 28. Individual rows and columns are not necessarily composed of equal numbers of logical '1' values and logical '0' values, however. In mask 90, individual rows and columns generally include between twenty-five to seventy-five percent logical '1' values. The arrangement of logical values in mask 90 is not fully random. If the mask logical values were fully random, the result would include clusters or "pools" of logical '0' values and logical '1' values in fast scan direction 26 and slow scan direction 28, but the mask would also be expected to include regions of alternating logical values such as '10101' in both directions. A truly random mask would also be expected to include strings of logical values in the both directions broken up by a single complementary logical value, such as '0001000.'

In mask 90, the mask logical values tend to be pooled, with fewer instances of alternating logical values and fewer instances of isolated single logical values. Moreover, the pools may tend to cross over from mask subset to successive mask subset, as shown by small cluster of logical '1' values 108, which straddles two mask subsets 98 and 92.

One of every eight lines of mask 90, specifically lines 100, 102, 104 and 106, correspond to line nine of the laser array. Because line nine does not print masked image data, the logical values in lines 100, 102, 104 and 106 are ignored. Alternatively, the logical values in lines 100, 102, 104 and 106 may be used to mask the image data printed by line one.

Figure 6:
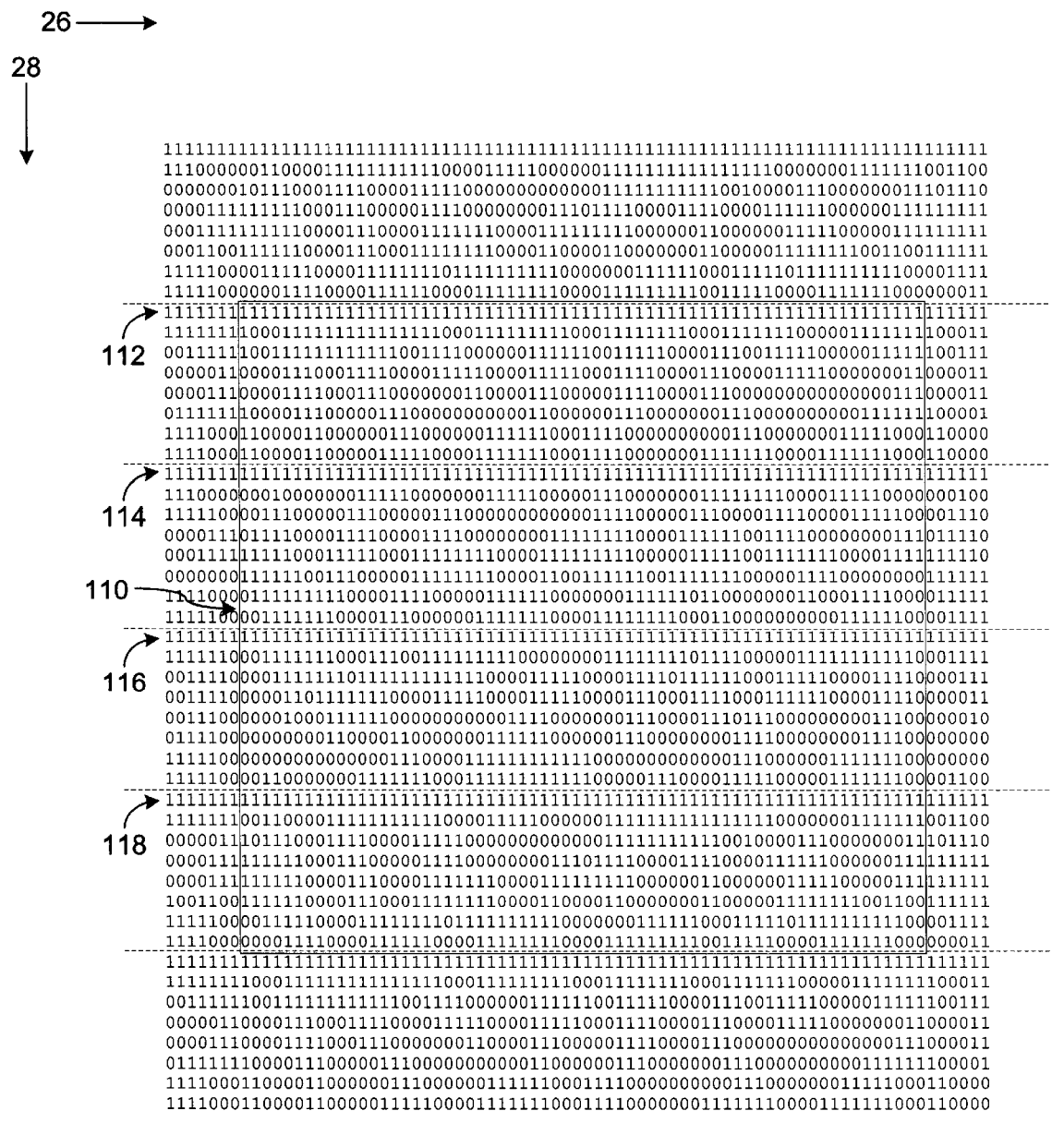

FIG. 6 shows an alternate exemplary mask 110. Mask 110 is like mask 90, except that lines 112, 114, 116 and 118, which correspond to line nine of the laser array, consist entirely of logical '1' values. When the image data for pixels printed by line nine is combined by a logical AND operation with the mask logical value corresponding to the pixel, the result is that image data printed by line nine is printed normally.

A mask such as mask 90 may be converted to a mask such as mask 110 by periodically converting lines in the mask to logical '1' values. In other words, the spacing between lines 112 and 114 is equal to the spacing between lines 114 and 116, and so on. In mask 110, a line of logical '1' values appears every eight lines, but the invention is not limited to a spacing of eight lines. The spacing of lines of logical '1' values may depend upon the number of lasers in the array and which laser will print a line that will be overlapped by line one.

Line one may be masked in many different ways. As discussed above, line one may be masked by using selected lines from masks 90 or 110. Line one would ordinarily not be masked with lines 112, 114, 116 or 118, however, because lines nine and one would print the same image data twice with no masking. The effect may be an excess of thermal energy resulting in the transfer of excess colorant.

Line one may be masked with a simple repeating pattern. The simple pattern may be far less complex than masks 90 or 110. For example, image data for pixels printed by line one may be combined by a logical AND operation with the hexadecimal value 0x55, which corresponds to a binary value of '01010101.' In this manner, line one simply prints every other pixel. A mask with a value of 0xAA ('10101010') has a similar effect. Another possible pattern is to print two pixels, and then skip two pixels. Masks with values of 0x33 ('00110011') and 0x66 ('01100110') and 0xCC ('11001100') may be used to generate this pattern.

The above techniques use a thermal effect caused by adjacent lasers. In laser thermal imaging, each laser in the array, when printing, derives some benefit from the heat generated by its neighbor lasers. As a result, printing by several adjacent lasers is more energy efficient than printing by an equal number of isolated lasers.

The laser that prints line one, however, is an end laser having only a single adjacent neighbor. Because that laser has only one neighbor, that laser does not derive as much thermal benefit and consequently tends to print lower density pixels. If this end laser were to print a line without overlapping, the line may be more narrow than lines printed by other lasers.

Accordingly, laser one primarily overlaps data already printed by the laser that prints line nine. The laser that prints line one masked does not print any data missed by the laser that printed line nine on the previous pass. Nevertheless, the laser that prints line one does serve an important function. By printing masked image data, the laser that prints line one provides heat for its neighbor laser, i.e., the laser that prints line two. As a result, the laser that prints line two is less likely to print lower density pixels.

Heat from adjacent lasers plays another role. When masked image data are printed, the pooling of logical values reduces the locations where a single laser or pair of adjacent lasers are activated. In this manner, pooling takes advantage of the thermal energy generated by a group of neighboring lasers. Using a mask with pooled mask logical values generally produces a more visually pleasing result than using a mask with truly random logical values, because pooling tends to result in printing by adjacent lasers more frequently.

In addition, composing a mask's rows and columns of approximately equal numbers of logical '0' values and logical '1' values tends to avoid creating light and dark lines within the image, thereby generating an image with a more pleasing appearance. The rows and columns need not be composed of approximately equal numbers of logical '0' values and logical '1' values, however.

A mask such as mask 90 or mask 110 may be generated mathematically or experimentally. Mask 90 was generated experimentally, through testing masks of several sizes, shapes and compositions of logical values. For example, the pooling of logical values was adjusted so that the pools would be large enough to take advantage of the thermal energy generated by a group of neighboring lasers, but small enough to break up swath lines.

An experimentally created mask has several advantages. When using an experimentally created mask, for example, computing resources in laser controller 20 need not be devoted to computationally generating a mask during the printing process. Instead, an experimentally created mask is static and is pre-made, enabling retrieval of the mask or any subset of the mask when needed. Furthermore, an experimentally created mask can be thoroughly tested under controlled conditions, and will therefore hold fewer surprises during actual printing.

The techniques described above assume that the number of lines printed normally is the same as the number of lines printed masked. The two numbers need not be equal. When each line is printed twice, the time needed to print an image is nearly doubled. The amount of duplicated printing can be reduced by having printing some of the lines twice, once normally and once masked, and printing the balance of the lines normally.

Figure 7:
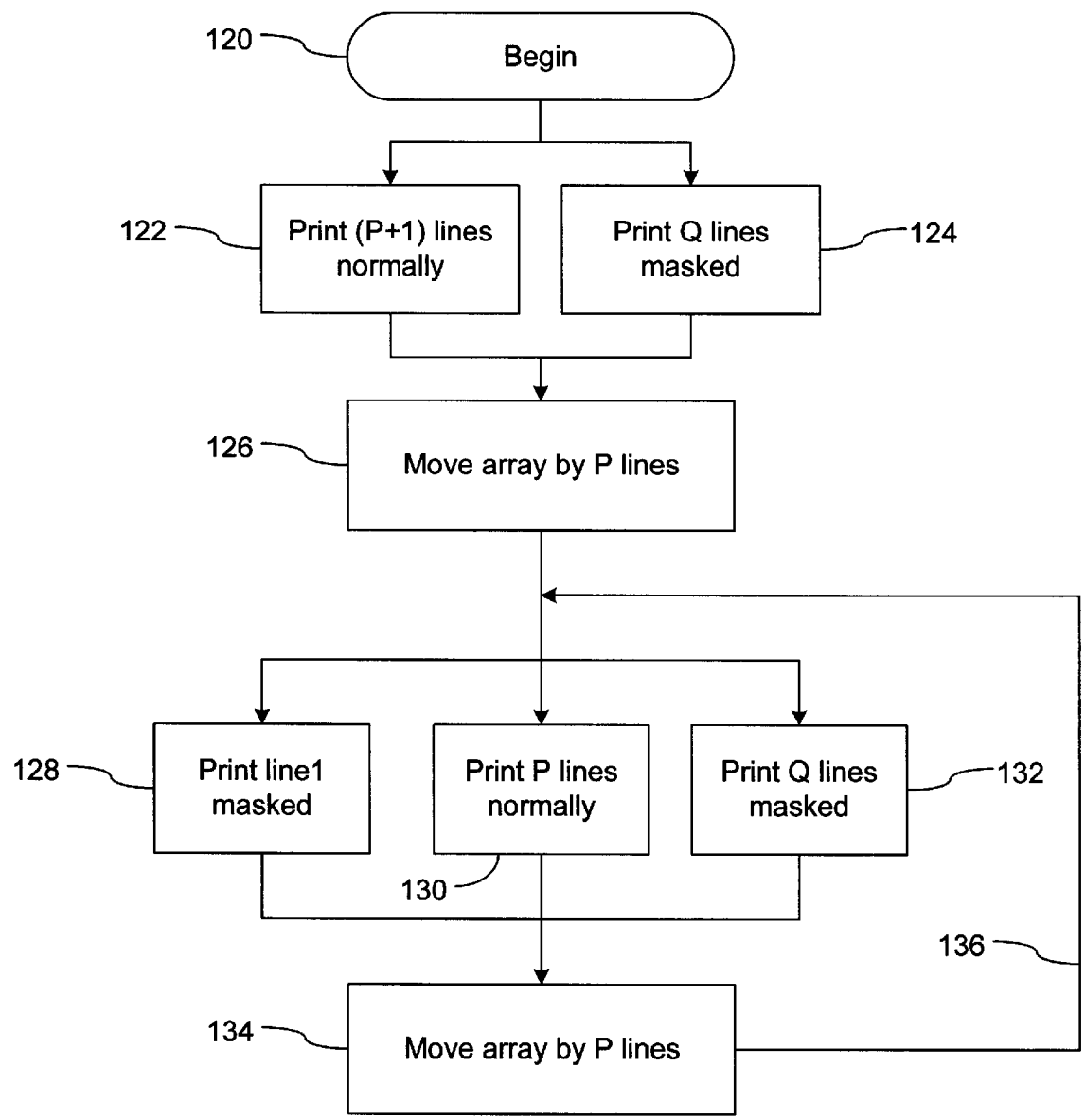
FIG. 7 is a flowchart illustrating an embodiment of the invention.

This technique is shown in FIG. 7. The lasers in the array may be identified as the laser that prints line one, P lasers that print image data normally, and Q lasers that print image data masked. If the total number of lasers in the array is N, then 1+P+Q=N. The number of overlapping lines is Q+1.

In a typical pass, the first line is printed masked (128), i.e., as a function of the image data and a first mask. The adjacent P lines are printed normally (130). The remaining Q lines are printed masked (132), i.e., as a function of the image data and a second mask. Optical head platform 18 moves the laser array by P lines (134) and the printing process may be repeated (136).

When printing first commences (120), the laser array may print P+1 lines normally (122) and Q lines masked (124). Optical head platform 18 moves the laser array by P lines (126). As with the technique shown in FIG. 3, the very first pass is the same as subsequent passes, except that the first line is printed normally and is not printed masked.

To illustrate the technique shown in FIG. 7, assume that four lines overlap. In this scenario, P=12 and Q=3. Lines one is printed masked (128), lines two through thirteen are printed normally (130) and lines fourteen through sixteen are printed masked (132). After a swath is printed, the laser array is moved by twelve lines, so that line one overlaps line thirteen from the previous pass, and lines two through four overlap lines fourteen through sixteen from the previous pass. Lines five through twelve are printed normally and are not overlapped.

An overlap of one or two lines generally does not adequately break up the swath lines. Three lines of overlap may produce good results, with additional lines of overlap producing marginal improvement. At some point, however, the marginal improvement due to overlapping an additional line becomes negligible. Overlapping eight lines, for example, may generate an image that is just as satisfactory as overlapping seven lines. The amount of overlap may vary from image to image, and may depend upon the features of the image such as density of color, resolution, screen angle, swath size, and halftone dot structure. The amount of overlap may also vary from color to color in a single image.

A number of embodiments of the present invention have been described. Nevertheless, various modifications may be made without departing from the scope of the invention. The number of lines printed normally is preferably greater than or equal to the number of lines printed masked, but this is not required for the invention. It is not necessary for the number of lines printed normally to be constant, nor is it necessary for the number of lines printed masked to be constant.

Furthermore, a laser thermal printer having eight lasers in an array, for example, may print each swath twice. In the first pass, all lines but the first are printed masked and in the second pass, all print lines are normally, except for the first, which is printed masked.

The laser thermal imaging system described above is exemplary, and the techniques for reducing swath lines may be employed with other laser thermal imaging systems, such as systems that print on a flat plane instead of a drum. Moreover, masks 90 and 110 shown in FIGS. 5 and 6 are not the only masks that may produce good results, and the invention is not limited to the particular masks shown. A mask need not have approximately equal numbers of logical '0' values and logical '1' values in rows, columns or in the mask as a whole, but may use different proportions of logical values.

A mask need not have the same dimensions as mask 90 or mask 110, although a larger mask tends to break up swath line patterns more pleasingly than a smaller mask. The mask need not be in the form of a rectangular matrix, but be a set of logical values in any shape that can tile a plane, such as a triangle, hexagon or rhombus. In addition, different masks may be created for different colors. Mask 90 may work well with cyan, for example, but a different mask may be used for magenta, which is printed at a different screen angle. These and other embodiments are within the scope of the following claims.

What is claimed is:

1. A method comprising:

printing a first line on a thermally sensitive medium with a first laser modulated as a function of a first set of data;

printing a first set of contiguous lines on the thermally sensitive medium with a first set of lasers modulated as a function of a second set of data and a first mask;

printing a second line on the thermally sensitive medium overlapping to first line with a second laser modulated as a function of the first set of data and a second mask; and printing a second set of contiguous lines on the thermally sensitive medium overlapping the first set of lines with a second set of lasers modulated as a function of the second set of data, wherein printing the first line and printing the second line comprise printing at least a portion of the first set of data twice.

2. The method of claim 1, further comprising printing the first line and printing the first set of lines in a first printing pass, and printing the second line and printing the second set of lines in a second printing pass.

3. The method of claim 1, further comprising printing the second line in a first direction, thereafter moving the lasers in a second direction, and thereafter printing the first line in the first direction over the second line.

4. The method of claim 1, further comprising printing the first set of lines in a first direction, thereafter moving the lasers in a second direction, and thereafter printing the second set of lines in the first direction over the first set of lines.

5. The method of claim 1, wherein the first set of contiguous lines and the second set of contiguous lines include the same number of lines.

6. The method of claim 1, further providing printing a third set of contiguous lines on the thermally sensitive medium as a function of a third set of data.

7. The method of claim 1, wherein an array of lasers comprises the first laser, the first set of lasers, the second laser and the second set of lasers, and wherein the array includes an end laser, the method further comprising printing with the end laser the second line on the thermally sensitive medium overlapping the first line as a function of the first set of data and the second mask.

8. A method for printing with a laser imaging system having a plurality of lasers, the method comprising:

printing a first line on a thermally sensitive medium with a first laser modulated as a function of a set of data; and thereafter printing a second line on the thermally sensitive medium with a second laser modulated as a function of the set of data and a mask, wherein the second line overlaps the first line and wherein printing the first line and printing the second line comprise printing at least a portion of the first set of data twice.

9. The method of claim 8, wherein the set of data is a first set of data, the method further comprising printing a first set of contiguous lines on the thermally sensitive medium as a function of a second set of data, the first set of contiguous lines being adjacent to the second line.

10. The method of claim 8,
wherein the second line comprises pixels,
wherein the mask comprises a set of logical values, each logical value corresponding to a pixel, and
wherein a pixel is printed when the value in the first mask corresponding to the pixel is logical '1.'

11. The method of claim 10, wherein the set of logical values comprises at least one of the hexadecimal values 0x33, 0x55, 0x66, 0xAA and 0xCC.

12. The method of claim 10, wherein the first laser and the second laser are the same laser.

13. A system comprising:
a thermally sensitive color donor including colorant;
a receptor positioned to receive colorant from the donor
a set of lasers, each of the lasers emitting a beam directed at the donor, and
a controller that controls a first laser as a function of image data and a first mask, controls a first subset of lasers as a function of the image data, and controls a second subset of lasers as a function of the image data and a second mask,
wherein each beam defines a line, wherein the controller controls the set of lasers to print a first line on a first pass, and wherein the controller controls the first laser to print at least a portion of the first line on a second pass.

14. The system of claim 13,
wherein the set of lasers is mounted in a writing head; and
wherein the writing head is movable in a first direction after the first pass.

15. The system of claim 13, wherein the lasers are semiconductor lasers.

16. The system of claim 13, further comprising a mounting surface configured to receive the donor and the receptor.

17. The system of claim 16, wherein the mounting surface is a rotatable drum.

18. The system of claim 13, wherein the controller includes memory, the memory configured to store the first and second masks.

19. The system of claim 18, the memory configured to store the image data.

20. A method comprising:
defining a set of logical values, the set of logical values including lines of logical values;
arranging the logical values in a first dimension corresponding to a first direction and in A second dimension corresponding to a second direction, wherein approximately half of the values in the first dimension are logical '1' and wherein approximately half of the values in the second dimension are logical '1'; and
converting every logical value in a chosen line of logical values to logical '1'; and printing a line on a thermally sensitive medium with a laser modulated as a function of a set of a set of data and a subset of the logical values.

21. The method of claim 20, wherein each of the logical values corresponds to a pixel, the method further comprising:
generating an enabling printing signal when the value corresponding to the pixel is one of a logical '0' or a logical '1'; and
generating a disabling printing signal when the value corresponding to the pixel is the other of a logical '0' or a logical '1.'

22. The method of claim 20, wherein the chosen line of logical values is a first chosen line of logical values, the method further comprising:
converting every logical value in a second chosen line of logical values to logical '1'; and
converting every logical value in a third chosen line of logical values to logical '1,'
wherein the spacing between the first chosen line of logical values and the second chosen line of logical values is equal to the spacing between the second chosen line of logical values and the third chosen line of logical values.

23. A computer-readable medium carrying program code that, when executed, causes a machine to:
define a set of logical values, the set of logical values including lines of logical values;
arrange the logical values in a first dimension corresponding to a first direction and in a second dimension corresponding to a second direction, wherein approximately half of the values in the first dimension are logical '1' and wherein approximately half of the values in the second dimension are logical '1';
convert every logical value in a chosen line of logical values to logical '1'; and
print a line on a thermally sensitive medium with a laser modulated as a function of a set of a set of data and a subset of the logical values.

24. The medium of claim 23, wherein each of the logical values corresponds to a pixel, the program code further causing a machine to:
generate an enabling printing signal when the value corresponding to the pixel is one of a logical '0' or a logical '1'; and
generate a disabling printing signal when the value corresponding to the pixel is the other of a logical '0' or a logical '1.'

25. The medium of claim 23, wherein the chosen line of logical values is a first chosen line of logical values, the program code further causing a machine to:
convert every logical value in a second chosen line of logical values to logical '1'; and
convert every logical value in a third chosen line of logical values to logical '1,'
wherein the spacing between the first chosen line of logical values and the second chosen line of logical values is equal to the spacing between the second chosen line of logical values and the third chosen line of logical values.

26. A method comprising:
printing a first line on a thermally sensitive medium with a first laser modulated as a function of a first set of data without a mask;

printing a first set of contiguous lines on the thermally sensitive medium with a first set of lasers modulated as a function of a second set of data and a first mask printing a second line ante thermally sensitive medium overlapping the first line with a second laser modulated as a function of the first set of data and a second mask; and printing a second set of contiguous lines on the thermally sensitive medium overlapping the first set of lines with a second set of lasers modulated as a function of the second set of data without a mask.

27. The method of claim 26, further comprising printing the first line and printing the first set of lines in a first printing pass, and printing the second line and printing the second set of lines in a second printing pass.

28. A method for printing with a laser imaging system having a plurality of lasers, the method comprising:

printing a first line on a thermally sensitive medium with a first laser modulated as a function of a set of data without a mask; and thereafter printing a second line on the thermally sensitive medium with a second laser modulated as a function of the set of data and a mask;

wherein the second line overlaps the first line.

29. The method of claim 28, wherein the set of data is a first set of data, the method further comprising printing a first set of contiguous lines on the thermally sensitive medium as a function of a second set of data, the first set of contiguous lines being adjacent to the second line.

30. The method of claim 23, wherein the second line comprises pixels, wherein the mask comprises a set of logical values, each logical value corresponding to a pixel, and wherein a pixel is printed when the value in the first mask corresponding to the pixel is logical '1.'

* * * * *